United States Patent
Yang et al.

(12)

(10) Patent No.: US 10,737,983 B2
(45) Date of Patent: Aug. 11, 2020

(54) BLACK ZIRCONIA SINTERED BODY AND PREPARATION METHOD THEREFOR AND USE THEREOF

(71) Applicant: Shandong Sinocera Functional Material Co., Ltd., Dongying, Shandong (CN)

(72) Inventors: Aimin Yang, Shandong (CN); Xuekui Mo, Shandong (CN); Xibin Song, Shandong (CN)

(73) Assignee: Shandong Sinocera Functional Material Co., Ltd., Dongying (CN)

( * ) Notice: Subject to any disclaimer, the term of this patent is extended or adjusted under 35 U.S.C. 154(b) by 0 days.

(21) Appl. No.: 16/329,519

(22) PCT Filed: Aug. 3, 2017

(86) PCT No.: PCT/CN2017/095745
§ 371 (c)(1),
(2) Date: Feb. 28, 2019

(87) PCT Pub. No.: WO2018/040833
PCT Pub. Date: Mar. 8, 2018

(65) Prior Publication Data
US 2019/0194076 A1    Jun. 27, 2019

(30) Foreign Application Priority Data

Aug. 31, 2016 (CN) .......................... 2016 1 0792397

(51) Int. Cl.
*C04B 35/486* (2006.01)
*C04B 35/626* (2006.01)
*C04B 35/64* (2006.01)

(52) U.S. Cl.
CPC ........ *C04B 35/486* (2013.01); *C04B 35/6268* (2013.01); *C04B 35/62645* (2013.01); *C04B 35/62675* (2013.01); *C04B 35/62695* (2013.01); *C04B 35/64* (2013.01); *C04B 2235/3217* (2013.01); *C04B 2235/3224* (2013.01); *C04B 2235/3225* (2013.01); *C04B 2235/3232* (2013.01); *C04B 2235/3241* (2013.01); *C04B 2235/3246* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/443* (2013.01); *C04B 2235/5409* (2013.01); *C04B 2235/5445* (2013.01); *C04B 2235/6022* (2013.01); *C04B 2235/61* (2013.01); *C04B 2235/658* (2013.01); *C04B 2235/77* (2013.01); *C04B 2235/96* (2013.01); *C04B 2235/9661* (2013.01)

(58) Field of Classification Search
CPC .............................. C04B 35/48; C04B 35/486
See application file for complete search history.

(56) References Cited

U.S. PATENT DOCUMENTS

| | | | | |
|---|---|---|---|---|
| 4,656,145 A | * | 4/1987 | Soroi | ..................... G04B 37/22 501/86 |
| 5,711,906 A | * | 1/1998 | Briod | .................... C04B 35/486 264/681 |
| 2003/0139279 A1 | * | 7/2003 | Niwa | ...................... C04B 33/14 501/103 |
| 2007/0270304 A1 | * | 11/2007 | Fujisaki | ............... C01G 25/006 501/105 |
| 2015/0283791 A1 | * | 10/2015 | Yamashita | .......... C04B 35/6455 428/34.7 |

FOREIGN PATENT DOCUMENTS

| | | |
|---|---|---|
| CN | 1566021 A | 1/2005 |
| CN | 101172838 A | 5/2008 |
| CN | 101704671 A | 5/2010 |
| CN | 102838348 A | 12/2012 |
| CN | 104086175 A | 10/2014 |
| CN | 104529437 A | 4/2015 |
| CN | 106431394 A | 2/2017 |
| EP | 0826645 A2 * | 3/1998 ......... C04B 35/6455 |

OTHER PUBLICATIONS

International Written Opinion for International Application No. PCT/CN2017/095745 dated Nov. 15, 2017, 6 pages.
International Search Report for International Application No. PCT/CN2017/095745 dated Nov. 15, 2017, 2 pages.
Fenling et al., Preparation of Black-Colored Zirconia Ceramics via Heterogeneous Precipitation, Journal of the Chinese Ceramic Society, vol. 39, No. 8, (Aug. 2011), pp. 1290-1294.

* cited by examiner

*Primary Examiner* — Karl E Group
(74) *Attorney, Agent, or Firm* — TraskBritt

(57) ABSTRACT

A black zirconia sintered body is obtained by processing and forming a powder for the black zirconia sintered body, and then sintering the same at a high temperature and normal pressure in the atmosphere. The powder for the black zirconia sintered body is prepared by a hydrothermal synthesis method using a soluble zirconium salt, a soluble yttrium salt and a color former as raw materials, wherein the molar ratio of the soluble zirconium salt, the soluble yttrium salt and the color former is 90-95:1-5:1-9. The black zirconia sintered body can be used in ceramic processes.

9 Claims, No Drawings

BLACK ZIRCONIA SINTERED BODY AND PREPARATION METHOD THEREFOR AND USE THEREOF

CROSS-REFERENCE TO RELATED APPLICATION

This application is a national phase entry under 35 U.S.C. § 371 of International Patent Application PCT/CN2017/095745, filed Aug. 3, 2017, designating the United States of America and published as International Patent Publication WO 2018/040833 A1 on Mar. 8, 2018, which claims the benefit under Article 8 of the Patent Cooperation Treaty to Chinese Patent Application Serial No. 201610792397.1, filed on Aug. 31, 2016, the disclosure of each of which is hereby incorporated herein in its entirety by this reference.

TECHNICAL FIELD

This disclosure relates to the field of chemical industry, specifically, to a black zirconia sintered body and preparation method therefor and use thereof.

BACKGROUND

Existing black zirconia ceramics are obtained by two processing methods. One method includes forming a green body from white zirconia and then performing carburization. This process for preparing a black zirconia sintered body involves complicated techniques, needs sintering under a protective atmosphere, and has high requirements for equipment. Additionally, the pigment has high volatility during the sintering process, and the equipment is seriously polluted. The other method includes adding a metal oxide coloring agent to zirconia powder. However, due to the problems such as a tendency to form large particles and an uneven distribution of the metal oxide, the sintered body of zirconia ceramic has low strength, cracking, uneven and dark color, etc.

CN1566021 discloses a method for preparing black zirconia ceramics, in which the work piece blank needs to be sintered under vacuum or protective atmosphere after being dewaxed and degreased, and which has high requirements for sintering equipment and high sintering temperature (1550 to 1650° C.). This method involves complicated manufacturing techniques, and requires use of graphite for carburizing and coloring treatment during the sintering process, and the sintering process also leads to serious pollution of the equipment.

BRIEF SUMMARY

One object of the present disclosure is to provide a black zirconia sintered body and preparation method therefor.

Another object of the present disclosure is to provide use of the black zirconia sintered body in a ceramic process.

With an aim to achieve these objects, the present disclosure firstly provides a powder for the black zirconia sintered body. The powder is prepared by the following steps:

S1, a soluble zirconium salt and a soluble yttrium salt are mixed at a ratio and dissolved in water, a coloring agent is added, an ammonia water is added slowly under stirring, and the pH of the slurry is adjusted to 8 to 10 with ammonia water;

S2, the above slurry is transferred to a reaction kettle, and subjected to hydrothermal synthesis at 140 to 200° C. for 10 to 72 hours;

S3, the resultant reaction solution is washed with water and dried to obtain a powder;

S4, the powder is subjected to heat treatment at 800 to 1200° C. for 2 to 5 hours, and then grinding and dispersing; and S5, the dispersed particles are granulated to obtain a powder for a black zirconia sintered body.

In step S1, the molar ratio of the soluble zirconium salt, the soluble yttrium salt and the coloring agent is 90-95:1 to 5:1 to 9, preferably from 92:3:5.

The powder for black zirconia sintered body of this disclosure has a Brunauer-Emmett-Teller (BET) specific surface area of 10 to 16 $m^2/g$, and an average particle diameter of 0.1 to 0.3 μm.

The soluble zirconium salt includes zirconium oxychloride, zirconium nitrate, zirconium sulfate and the like; and the soluble yttrium salt includes yttrium chloride, yttrium nitrate, yttrium sulfate and the like.

The coloring agent includes at least one material chosen from among cobalt oxide, manganese oxide, iron oxide, titanium oxide, aluminum oxide, nickel oxide, copper oxide, erbium oxide, silicon oxide, zinc oxide, chromium oxide and the like.

The present disclosure also provides a black zirconia sintered body prepared from the powder, wherein the sintered body has an L value of ≤3, an a value of −1 to 1, a b value of −1 to 1, a ceramic body density of ≥6.0 $g/cm^3$, and a three-point flexural strength of ≥1100 MPa, wherein L represents luminosity, a represents the range from magenta to green, and b represents the range from yellow to blue. The range of L value is from 0 to 100, both ranges of a and b values are from +127 to −128, and a and b can be measured by spectrocolorimeter.

The black zirconia sintered body of the present disclosure can be prepared by the following method: the powder is processed and molded to form a green body, and then subjected to high-temperature sintering in atmosphere under the normal pressure. For example, the powder can be processed into work piece blank by dry compression molding under a molding pressure of 150 to 250 MPa.

In the above method, the temperature for high-temperature sintering is maintained at 1400 to 1550° C. for 1 to 4 hours.

In the present this disclosure, the powder can be processed and molded by compression molding or injection molding.

The present disclosure also provides use of the black zirconia sintered body in ceramic process. For example, it can be used in ceramic knife, watch case, mobile phone case, abrasive tools, decorations and other structural members.

The present disclosure further provides a ceramic material comprising the black zirconia sintered body.

The present disclosure may provide at least one of the following advantages:

The black zirconia sintered body can be prepared using the powder for black zirconia sintered body provided in this disclosure with simple process, and sintering can be performed at a lower temperature (1400 to 1550° C.) directly after degreasing, without other treatment processes; protective atmosphere and hot pressed sintering are not needed during sintering; the sintered body has uniform texture, high strength, and a three-point flexural strength of ≥1100 MPa; the sintering has no pollution and low requirements for equipment.

DETAILED DESCRIPTION

The following Examples are intended to illustrate embodiments of the present disclosure, but are not intended to limit the scope of the present invention. Unless otherwise specified, the technical means used in the examples are conventional means well known to those skilled in the art, and the raw materials used are all commercially available products.

The percent sign "%" involved in this disclosure means a percentage by mass unless otherwise specified. However, the percentage of a solution, unless otherwise specified, means the number of grams of the solute contained in 100 mL solution.

EXAMPLES 1 to 5: Powder for Black Zirconia Sintered Body

The powder for black zirconia sintered body was obtained from a soluble zirconium salt, a soluble yttrium salt and a coloring agent as raw materials by hydrothermal synthesis (Table 1).

TABLE 1

The powder for black zirconia sintered body

| | Molar ratio of raw materials and various components | BET value of the resulting powder, $m^2/g$ | Average diameter of the powder, $\mu m$ |
|---|---|---|---|
| Example 1 | zirconium nitrate, yttrium nitrate and coloring agent (iron oxide and/or manganese oxide) with the molar ratio of 94:3:3 | 12.98 | 0.20 |
| Example 2 | zirconium nitrate, yttrium nitrate and coloring agent (iron oxide and/or cobalt oxide) with the molar ratio of 91:3.5:5.5 | 11.23 | 0.21 |
| Example 3 | zirconium nitrate, yttrium nitrate and coloring agent (iron oxide and/or cobalt oxide and/or copper oxide) with the molar ratio of 93:2:5 | 13.35 | 0.18 |
| Example 4 | zirconium nitrate, yttrium nitrate and coloring agent (iron oxide and/or aluminum oxide and/or copper oxide) with the molar ratio of 92:3:5 | 15.65 | 0.15 |
| Example 5 | zirconium nitrate, yttrium nitrate and coloring agent (iron oxide and/or manganese oxide and/or copper oxide) with the molar ratio of 91:4:5 | 10.89 | 0.26 |

The specific process was as follows:

S1, the soluble zirconium salt and the soluble yttrium salt were mixed at a ratio and dissolved in water, the coloring agent was added, ammonia water was added slowly under stirring, and the pH of the slurry was adjusted to 8 to 10 with ammonia water;

S2, the above slurry was transferred to a reaction kettle, and subjected to hydrothermal synthesis at 140 to 200° C. for 10 to 72 hours;

S3, the resultant reaction solution was washed with water and dried to obtain a powder;

S4, the powder was subjected to heat treatment at 800 to 1200° C. for 2 to 5 hours, and then grinding and dispersing; and S5, the dispersed particles were granulated to obtain the powder for black zirconia sintered body.

EXAMPLES 6 to 10: Black Zirconia Sintered Body and Preparation Method Thereof

The powder obtained in Examples 1 to 5 was subjected to dry compression molding (molding pressure of 150 to 250 MPa), and sintered at 1400 to 1550° C. in the atmosphere under normal pressure for 1 to 4 hours to give a black zirconia sintered body.

The various indexes of the obtained sintered body products were shown in Table 2.

TABLE 2

Indexes of the black zirconia sintered body products

| | L value | a value | b value | Ceramic body density, $g/cm^3$ | Three-point flexural strength, MPa |
|---|---|---|---|---|---|
| Example 1 | 2.3 | −0.03 | −0.02 | 6.001 | 1337.3 |
| Example 2 | 2.5 | −0.01 | 0.01 | 5.999 | 1298.3 |
| Example 3 | 2.2 | 0.01 | −0.03 | 5.998 | 1468.9 |
| Example 4 | 2.3 | −0.02 | −0.04 | 5.999 | 1489.0 |
| Example 5 | 2.9 | −0.03 | 0.02 | 6.000 | 1231.3 |

The black zirconia sintered body provided in this disclosure can be used in the manufacture of ceramic knives, watch cases, mobile phone cases, abrasive tools, decorations and other structural members.

Although this disclosure is described in detail with general description and specific embodiments as above, it will be apparent to a person skilled in the art that some modifications and improvements can be made. Therefore, such modifications or improvements made without departing from the spirit of this disclosure are intended to be within the scope of this disclosure.

INDUSTRIAL APPLICABILITY

The black zirconia sintered body provided in this disclosure can be used in ceramic process. The black zirconia sintered body can be prepared using the zirconia powder of this disclosure with simple process, and protective atmosphere and hot pressed sintering are not needed during sintering; the sintered body has uniform texture, high strength, and a three-point flexural strength of ≥1100 MPa; and the sintering is free of pollution.

What is claimed is:

1. A method of forming a powder for a black zirconia sintered body, the method comprising the following steps:

S1, mixing a soluble zirconium salt and a soluble yttrium salt at a ratio and dissolving the zirconium salt and the yttrium salt in water to form a slurry, adding a coloring agent, and adjusting the pH of the slurry to 8 to 10 with ammonia water under stirring, wherein the molar ratio of the soluble zirconium salt, the soluble yttrium salt, and the coloring agent is 90 to 95:1 to 5:1 to 9;

S2, subjecting the slurry to hydrothermal synthesis at 140 to 200° C. for 10 to 72 hours to form a resultant reaction solution;

S3, washing the resultant reaction solution with water and drying to obtain a powder;

S4, subjecting the powder to heat treatment at 800 to 1200° C. for 2 to 5 hours, and then grinding and dispersing the powder; and S5, granulating the dispersed particles to obtain the powder for a black zirconia sintered body.

2. The method of claim 1, wherein the zirconia powder has a BET specific surface area of 10 to 16 $m^2/g$, and an average particle diameter of 0.1 to 0.3 μm.

3. The method of claim 1, wherein the coloring agent in step S1 includes at least one selected material chosen from among cobalt oxide, manganese oxide, iron oxide, titanium oxide, aluminum oxide, nickel oxide, copper oxide, erbium oxide, silicon oxide, zinc oxide and chromium oxide.

4. The method of claim 1, further comprising sintering the powder to form a black zirconia sintered body.

5. The method of claim 4, wherein the black zirconia sintered body has an L value of ≤3, an a value of −1 to 1, a b value of −1 to 1, a ceramic body density of ≥6.0 g/cm³, and a three-point flexural strength greater than or equal to 1100 MPa.

6. The method of claim 4, wherein sintering the powder comprises processing and molding the powder to form a green structure, and then subjecting the green structure to high-temperature sintering in an atmosphere at atmospheric pressure.

7. The method of claim 6, wherein the high-temperature sintering is performed at 1400 to 1550° C. for 1 to 4 hours.

8. The method of claim 6, processing and molding the powder to form a green structure comprises compression molding or injection molding the powder to form the green structure.

9. The method of claim 1, wherein the molar ratio of the soluble zirconium salt, the soluble yttrium salt, and the coloring agent is 92:3:5 in step S1.

\* \* \* \* \*